Aug. 18, 1936.       G. W. CRIST       2,051,547

PISTON

Filed March 5, 1934

INVENTOR.
George W. Crist
BY
Ray, Oberlin & Ray
ATTORNEYS.

Patented Aug. 18, 1936

2,051,547

UNITED STATES PATENT OFFICE 2,051,547

PISTON

George W. Crist, Detroit, Mich., assignor to The Cleveland Graphite Bronze Company, Cleveland, Ohio, a corporation of Ohio Application March 5, 1934, Serial No. 714,016

4 Claims. (Cl. 309—15)

The present invention, relating as indicated to pistons, is more particularly directed to a new and improved composite piston consisting of separable head and skirt portions.

The principal object of the invention is the provision of a piston of this type in which the head and skirt portions may be formed separately, the head of a light weight metal of high conductivity such for example as aluminum, magnesium, or similar material and the skirt portion of a harder metal such as iron or steel of relatively low conductivity and low coefficient of expansion. A further object of the invention is the provision of a simple but effective joint between the two portions after their individual manufacture and one which will permit of the individual expansion of the two elements without affecting the tightness of the permanence of the joint therebetween.

To the accomplishment of the foregoing and related ends, said invention, then, consists of the means hereinafter fully described and particularly pointed out in the claims; the annexed drawing and the following description setting forth in detail certain mechanism embodying the invention, such disclosed means constituting, however, but one of various mechanical forms in which the principle of the invention may be used.

In said annexed drawing:—

Figure 1:
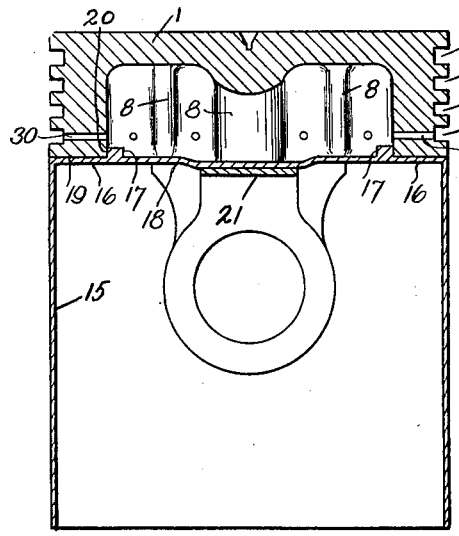
Figure 2:
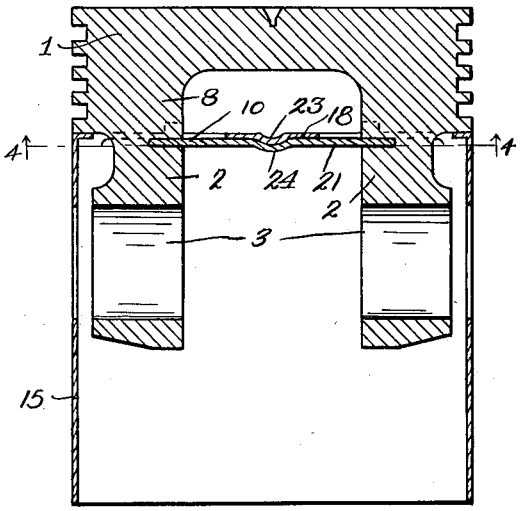
Figure 3:
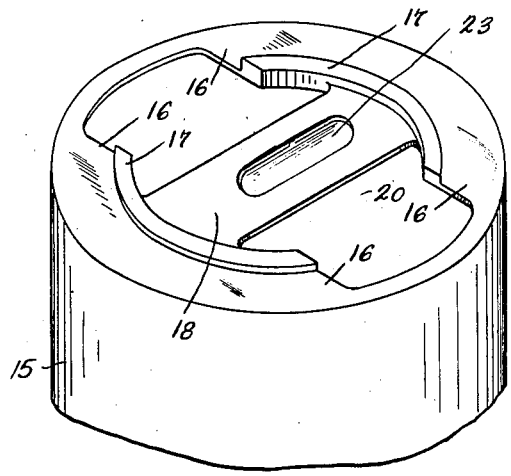

Fig. 1 is a central longitudinal section through my improved piston; Fig. 2 is a similar view at right angles to the plane of Fig. 1; Fig. 3 is a view in perspective of the skirt portion; and Fig. 4 is a section on the line 4—4 of Fig. 2.

Figure 4:
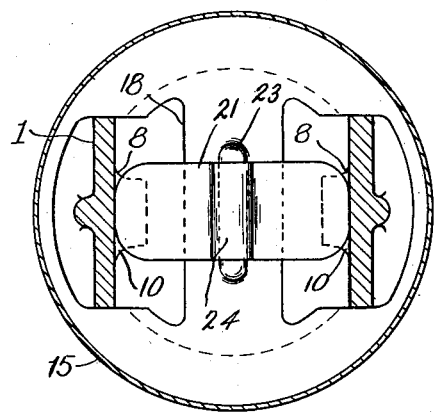

Referring now to Figs. 1, 2 and 4, there is shown a piston consisting of a head 1 formed of a light weight metal such as aluminum, magnesium or an alloy thereof, this head being of substantial thickness and provided with depending portions 2 which constitute piston pin bosses and which are provided with openings 3 for the piston pins. This head 1 is provided with usual grooves 4, 5, 6 and 7 for receiving piston rings and may be reinforced by one or more transversely extending ribs 8 on the lower side of the head proper, one of these ribs extending to and assisting to support the piston pin bosses. This supporting rib 8 is provided with transversely extending aligned recesses or notches 10 for a purpose later to be described. The groove 7 is intended to receive a scraper ring and holes 30 are provided in the wall of the grooves to drain lubricant and fuel therefrom.

The skirt 15 is preferably formed of iron or steel, is of a relatively thin uniform wall section and is provided at its upper end with two opposite inwardly extending flanges 16, each of which is provided on its upper surface with a rib 17. The flanges 16 are connected by a reinforcing bar 18, provided with a projection 23 on its central lower face.

In assembling the two parts of the piston, the skirt is mounted over the bosses 2 on the head until the flanges 16 engage against the lower edge 19 of the head. The ribs 17 on the flanges 16 are formed to engage against the inner edge or corner 20 of the head and thus center the skirt with respect to the head. The bar 18, extending from the center of one rib 16 to the center of the opposite rib, passes down between the piston pin bosses during assembly of the skirt on the head.

The head and skirt sections are then locked in position by introducing a locking bar 21 beneath the bar 18, pressing the ends of this locking bar 21 upwardly in the piston until they are in the horizontal plane of the slots 10 and then rotating the locking bar until it engages within the slots 10, where it is fixed by means of registering projections 23 and 24 on the central portions of the member 18 and the locking bar 21 respectively. As there are no forces tending to rotate the head with respect to the skirt or to rotate the locking bar out of its locking position during the operation of the piston, the entire assembly is firmly and permanently locked or engaged in this manner.

The advantages of my improved construction are that it provides a head of light weight and high conductivity and a skirt portion which is also of very light weight, but which has substantially the same coefficient of expansion as the cylinder in which it is to be operated. The skirt can be of extreme thinness since there are no strains imposed on the skirt as the piston pin bosses which carry the piston pin and the connecting rod are rigidly secured to the head portion of the piston. The result of this construction is a piston which may be formed in separate pieces and then readily assembled to provide an article having approximately the same weight as an aluminum piston of good design, while the manufacture of the separate pieces making up the completed piston can be carried out in presses or hammers and without the loss and expense attendant on manufacture of these parts in molds as is the case in various types of pistons now in general use.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a piston, the combination of a head of light metal provided with piston pin bosses integral therewith, and said bosses having transversely aligned slots therein, a skirt of heavy metal provided with inwardly extending flanges having pilot means producing alignment of said head and skirt upon assembly, a bar interconnecting said flanges, a locking bar adapted to engage under said first named bar and within such slots in said bosses to resiliently lock said head and skirt together.

2. In a piston, the combination of a head of a metal of high conductivity and light weight provided with integral piston pin bosses thereon, said bosses having transversely aligned slots therein, and a skirt of a metal of low conductivity, said skirt having a uniform, relatively light wall thickness and inwardly extending flanges at its upper end, pilot means on said flanges producing alignment of said head and skirt upon assembly, a bar interconnecting said flanges and a locking bar adapted to engage under said first named bar and within such slots in said bosses to lock said head and skirt together.

3. In a piston, the combination of a head of light metal provided with piston pin bosses integral therewith, a skirt of heavy metal provided with inwardly extending flanges having means causing alignment of said head and skirt upon assembly, a bar interconnecting said flanges, and a second bar removably secured to said head and engaging said first-named bar for locking said head and skirt together.

4. In a piston, the combination of a head, a skirt provided with inwardly extending flanges in engagement with said head, a bar interconnecting said flanges, and a second bar removably secured to said head and engaging said first-named bar to lock said head and skirt together.

GEORGE W. CRIST.